United States Patent [19]
McCandless

[11] Patent Number: 5,662,087
[45] Date of Patent: Sep. 2, 1997

[54] INJECTION DEVICE FOR AN INTERNAL COMBUSTION ENGINE WITH DIRECT INJECTION

[75] Inventor: James C. McCandless, Grosse Pointe, Mich.

[73] Assignee: Avl Gesellschaft Für Verbrennungskraftmaschinen und Messtechnik m.b.H. Prof.Dr.Dr.h.c. Hans List, Graz, Austria

[21] Appl. No.: 623,253

[22] Filed: Mar. 28, 1996

[30] Foreign Application Priority Data

Mar. 20, 1995 [AT] Austria ......................... 181/95

[51] Int. Cl.$^6$ ......................................... F02M 37/04
[52] U.S. Cl. ........................ 123/446; 123/506; 417/440
[58] Field of Search ................... 123/446, 500–501, 123/506; 417/440, 307

[56] References Cited

U.S. PATENT DOCUMENTS

| | | | |
|---|---|---|---|
| 4,074,668 | 2/1978 | Indra | 417/307 |
| 4,598,685 | 7/1986 | Logie et al. | 417/440 |
| 4,605,166 | 8/1986 | Kelly | 123/446 |
| 5,529,042 | 6/1996 | Augustin et al. | 123/506 |

FOREIGN PATENT DOCUMENTS

| | | |
|---|---|---|
| 1260865 | 8/1968 | Germany. |
| 2834633 | 3/1980 | Germany. |

*Primary Examiner*—Thomas N. Moulis
*Attorney, Agent, or Firm*—Watson Cole Stevens Davis, P.L.L.C.

[57] ABSTRACT

Fuel injection system for an internal combustion engine with direct fuel injection, with an electromagnetic control valve for pressurization of a medium-pressure space, and a hydraulic amplification plunger comprising a medium-pressure plunger adjacent to the medium-pressure space and a high-pressure plunger adjacent to a high-pressure space, which latter is connected to a fuel delivery line on the one side and a nozzle space surrounding the fuel needle on the other side, the high-pressure space connecting to a fuel bypass line in at least one intermediate position of the high-pressure plunger. To improve rate shaping, especially at the beginning and end of injection, the proposal is put forward that in addition to the high-pressure plunger a pressure-dependent bypass valve be located in the flow path between the high-pressure space and the fuel bypass line, which bypass valve opens the flow connection between high-pressure space and fuel bypass line for a narrow range of pressures in the high-pressure space.

8 Claims, 3 Drawing Sheets

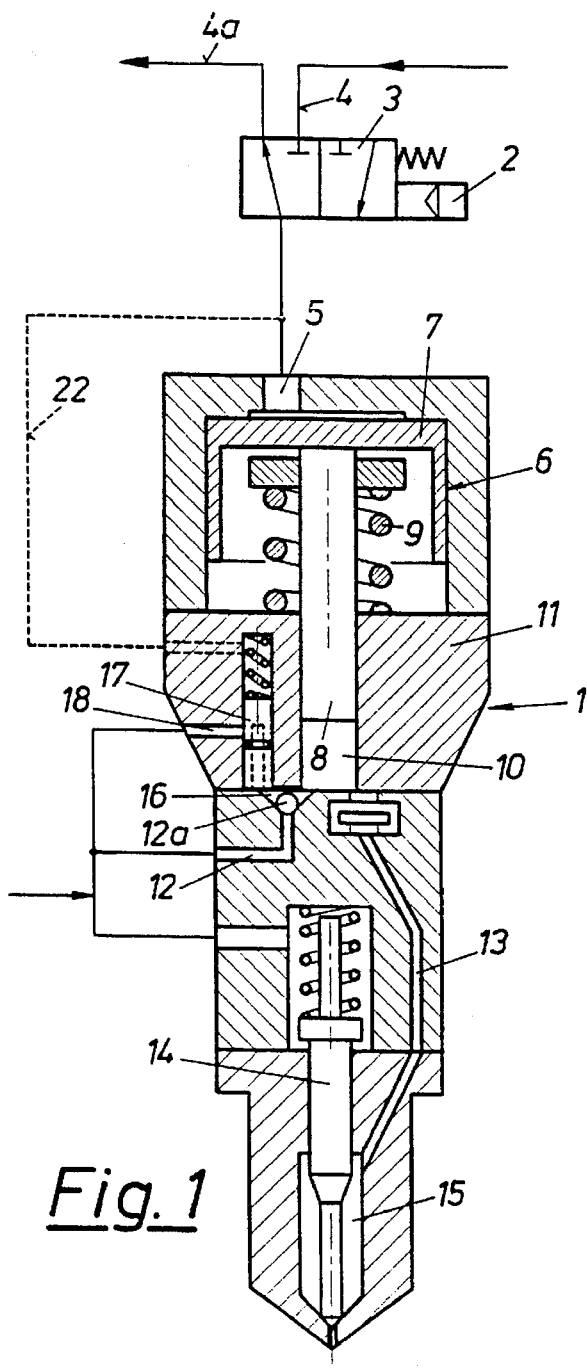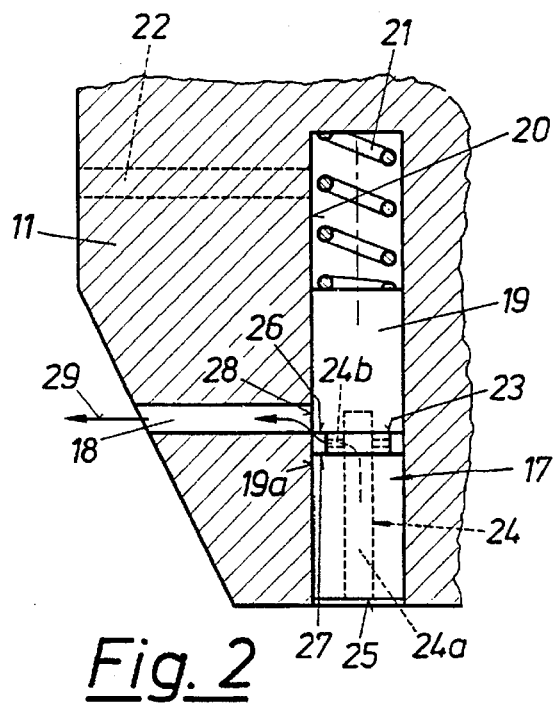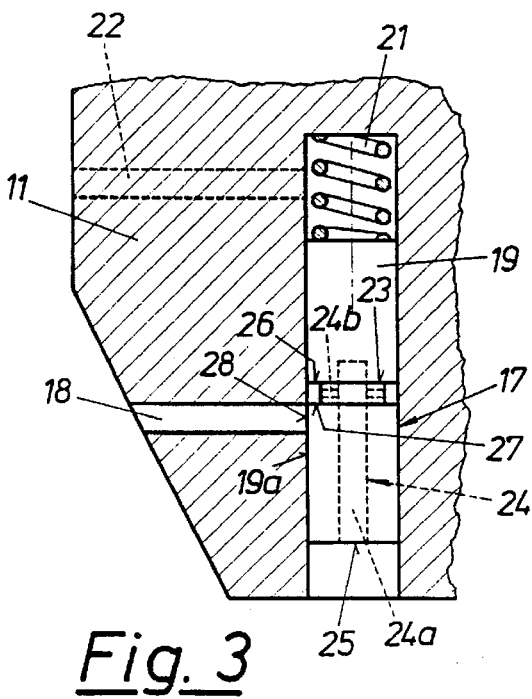

INJECTION DEVICE FOR AN INTERNAL COMBUSTION ENGINE WITH DIRECT INJECTION

BACKGROUND OF THE INVENTION

The present invention relates to a fuel injection system for an internal combustion engine with direct fuel injection, with an electromagnetic control valve for pressurizing a medium-pressure space from an external medium-pressure hydraulic reservoir, and a hydraulic amplification plunger comprising a medium-pressure plunger adjacent to the medium-pressure space and a high-pressure plunger adjacent to a high-pressure space, which high-pressure space is connected to a fuel delivery line on the one side and a nozzle space surrounding the fuel needle on the other side, where the high-pressure space can be connected to a fuel bypass line in at least one intermediate position of the high-pressure plunger.

DESCRIPTION OF THE PRIOR ART

Such an injection system is described in "Development of the HEUI Fuel System—Integration of Design, Simulation, Test, and Manufacturing" by A. R. STOCKNER, M. A. FLINN, and F. A. CAMPLIN, SAE Technical Papers Series No. 930721, International Congress and Exposition, Detroit, Mich., 1–5 Mar., 1993. The fuel injection system with rate shaping shown in FIGS. 5, 6, and 20 of that paper has a bypass line opening into the high-pressure cylinder, which is swept by the bypass plunger during the lift of the high-pressure plunger. In this way a flow connection is established between the high-pressure space and the bypass line when the high-pressure plunger is in an intermediate position, and rate shaping with pre-injection is achieved. Fuel bypassing at the beginning of injection is directly dependent on the lift of the high-pressure plunger, however, which has certain disadvantages. At low pressures in the medium pressure space, for instance, two separate injections may take place one after the other, and the fuel needle may open and close twice. Such opening and closing of the fuel needle is accompanied by an undesired deterioration of fuel atomization, and by an uneven distribution of the amount of injected fuel over the individual sprayholes. Furthermore, though the known system of fuel bypassing permits control of the beginning and duration of fuel injection, it does not permit influencing the slope of the rate shaping curve at the end of the injection process. The slope of the rate shaping curve at the end of injection should be as steep as possible, however, to lower smoke emissions of the internal combustion engine.

SUMMARY OF THE INVENTION

It is an object of the present invention to avoid the above disadvantages and to provide a fuel injection system by means of which rate shaping may be improved, especially at the beginning and end of injection.

According to the invention this is achieved by providing a pressure-dependent bypass valve in addition to the high-pressure plunger in the flow path between the high-pressure space and the fuel bypass line, which bypass valve will open the flow connection between high-pressure space and fuel bypass line for a narrow range of pressures in the high-pressure space. In this way bypassing of the fuel from the high-pressure space is effected in direct dependence on the pressure in the high- pressure space rather than simply depending on the lift of the high-pressure plunger. The bypass valve conveniently comprises a bypass plunger moving in a bypass cylinder, one of whose front faces can be subjected to high pressure via a line connecting to the high-pressure space, thus being movable against a restoring force acting on the bypass plunger, the bypass cylinder having an opening leading towards the fuel bypass line, which is swept By the control edges of a bypass space formed by the bypass plunger upon moving, the said bypass space being flow-connected with the high-pressure space, preferably via a bypass passage departing from the pressurized front face of the bypass plunger. The opening and closing pressure of the bypass valve may be accurately preset by suitably dimensioning the bypass plunger and the size of the counterforce. In this way there will be no separation between pre-injection and main injection even in the instance of low pressure in the medium-pressure space. Moreover, the steepness of the slope of the rate shaping curve at the beginning of injection may be preset by the restoring force.

The bypass space is preferably formed by a circumferential groove around the bypass plunger.

If the restoring force is at least partly provided by a spring acting on the bypass plunger, the slope steepness of the curve is determined mainly by the spring and by the dimensions of the bypass plunger as well as those of the bypass line. In addition to the spring, or instead of it, the restoring force may be provided at least partially by connecting the end of the bypass cylinder opposite of the high-pressure opening with the medium-pressure space via a medium-pressure line which is preferably configured as a throttling bore. It will thus be possible to make bypassing also dependent on the medium pressure, and to superimpose the counterforce provided by the medium pressure on the force of the spring.

It is provided in a very simple variant of the invention that the bypass valve be positioned in the housing of the high-pressure cylinder. In this variant bypassing is effected largely independently of the the lift of the high-pressure plunger.

In another preferred variant the proposal is put forward that the bypass valve be integrated in the high-pressure plunger. In this instance the high-pressure cylinder has a longitudinal groove next to the opening of the fuel bypass passage, which groove is connected to the opening of the bypass cylinder, its length preferably corresponding to the lift of the high-pressure plunger. The bypass valve moves together with the high-pressure plunger. As this variant will necessitate only modifications in the high-pressure plunger, conventional injection nozzles of the type mentioned at the beginning of this paper may be refitted. By suitably dimensioning the longitudinal groove in the high-pressure plunger, bypassing may be effected so as to be independent of pressure and pump lift.

BRIEF DESCRIPTION OF THE DRAWINGS

The invention will now be further described with reference to the accompanying drawings, in which FIG. 1 is a longitudional section of a first variant of the fuel injection system of the invention, FIG. 2 is an enlarged view of the bypass valve of FIG. 1 in a first position, FIG. 3 is a view of the bypass valve of FIG. 1 in another position.

Parts of the same function have the same reference numbers.

DETAILED DESCRIPTION OF PREFERRED EMBODIMENTS

Figure 4:
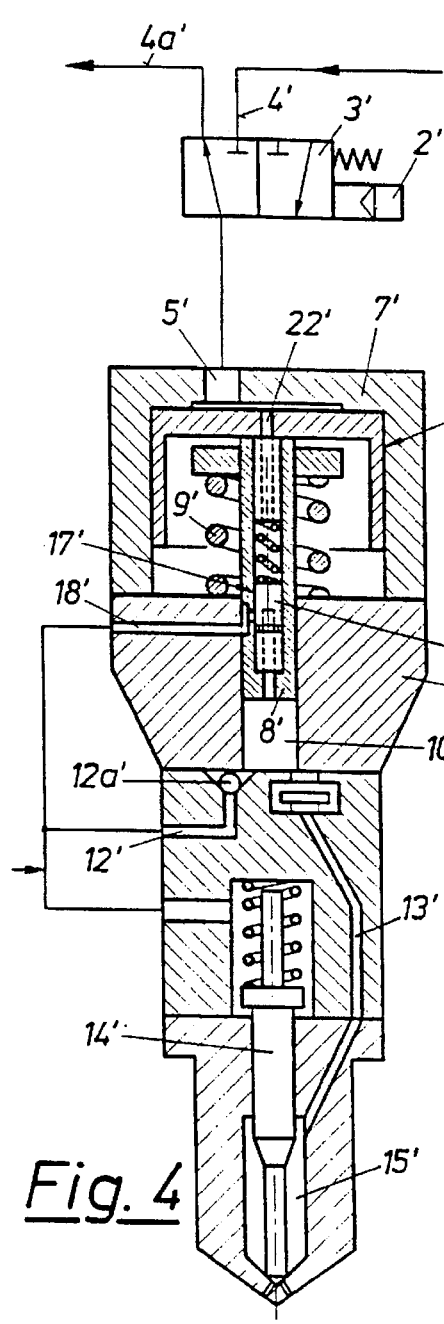
FIG. 4 is a longitudinal section of another variant of the injection nozzle described by the invention.

FIG. 1 shows a fuel injection system 1 for use with an internal combustion engine with direct fuel injection. The injection system 1 has a solenoid 2 for operation of a control valve 3, which is preferably configured as a 3/2-way valve and opens or stops the flow connection between a control line 4 and a medium-pressure space 5, and at the same time stops or opens the flow connection between an oil leakage line 4a and the medium-pressure space 5. The control line 4 starts from a medium-pressure hydraulic reservoir not shown here in detail. The oil leakage line 4a opens into a leakage tank not shown here in detail. Next to the medium-pressure space 5 there is a hydraulic amplification plunger 6, which comprises a medium-pressure plunger 7 and a high-pressure plunger 8 whose cross-section is smaller than that of the medium-pressure plunger 7. The hydraulic amplification plunger 6 is held in its initial position by a spring 9. The front end of the high-pressure plunger 8 is adjacent to a high-pressure space 10 which is formed by the high-pressure plunger 8 and the high-pressure cylinder 11a of the cylinder housing 11. Into the high-pressure space 10 opens a fuel delivery line 12, which is connected with a fuel supply system not shown here in detail, and which includes a check valve 12a. The high-pressure space 10 is further connected via a high-pressure line 13 to a nozzle space 15 surrounding the fuel needle 14.

From the high-pressure space 10 departs a connecting line 16, which is connected to a fuel bypass line 18 via a bypass valve 17.

The bypass valve 17 or 17' may be provided in the high-pressure cylinder 11, as shown in FIG. 1, or integrated in the high-pressure plunger 8', as shown in FIG. 4.

As is seen in the detailed views of FIGS. 2 and 3, the bypass valve 17 consists of a bypass plunger 19 moving in bypass cylinder 20. The connecting line 18 opens into the space generated by the bypass cylinder 20 such that a front face 25 of the bypass plunger 19 may be subjected to high pressure. A restoring force is exerted on the bypass plunger 19 by a spring 21, defining the initial position of the plunger. Instead of, or in addition to the spring 21 the bypass cylinder 20 may be connected to the medium-pressure space 5 via a medium-pressure line 22, as indicated by the broken line 22. The bypass plunger 19 has a circumferential groove 23 around its middle, into which opens a bypass passage 24 establishing a flow connection between the circumferential groove 23 and the connecting line 16. In this variant the bypass passage 24 is formed by a longitudinal bore 24a and a cross-bore 24b in the bypass plunger 19. If the front face 25 of the bypass plunger 19 is subject to pressure, the control edges 26 and 27 of the circumferential groove 23 will move across an opening 28 in the bypass cylinder 20, which leads to the fuel bypass line 18. As is symbolised by arrow 29 in FIG. 2, this will open the flow path between the bypass passage 24 and the fuel bypass line 18, and the fuel is bypassed in direct dependence on the pressure in the high-pressure space 10. Bypassing is performed here for a comparatively small pressure range. Once a predefined bypass pressure is exceeded, which is determined by the restoring force and the position of the control edges 28 and 27, the opening 28 is closed again by the side wall 19a of the bypass plunger 19, as is shown in FIG. 3.

The variant of an injection nozzle 1 with a bypass valve 17' presented in FIGS. 4 to 7, differs from that of FIGS. 1 to 3 only in that the bypass valve 17' is integrated in the high-pressure plunger 8'. The high-pressure plunger 8' is hollow, and the bypass cylinder 20' is constituted by a longitudinal bore in which the bypass plunger 19' slides up and down. As before, the bypass plunger 19' is held in an initial position by a restoring force, which may be provided by a spring 21' and/or a medium-pressure line 22' in the medium-pressure plunger 7' between the bypass cylinder 20' and the medium-pressure space 5'. The bypass cylinder 20' is flow-connected with the high-pressure space 10' via a connecting line 16', such that the front face 25' of the bypass plunger 19' is subject to high pressure. Upon a pressure rise in the high-pressure space 10' and in the connecting line 18' the bypass plunger 19' will move against the restoring force, the flow connection between the connecting line 16' and the fuel bypass line 18' being established in an intermediate position shown in FIG. 6. As in the previous example, the bypass plunger 19' has a bypass passage 24' formed by a longitudinal bore 24a' and a cross-bore 24b, which opens into a circumferential groove 23' of the bypass plunger 19'. The high-pressure plunger 8' is provided with a longitudinal groove 29 next to the opening 28a' of the fuel bypass line 18' into the high-pressure cylinder 11a', the length of which longitudinal groove 29 corresponds to the lift of the high-pressure plunger 8'. The longitudinal groove 29 is connected to the bypass cylinder 20' via the opening 28'.

Figure 5:
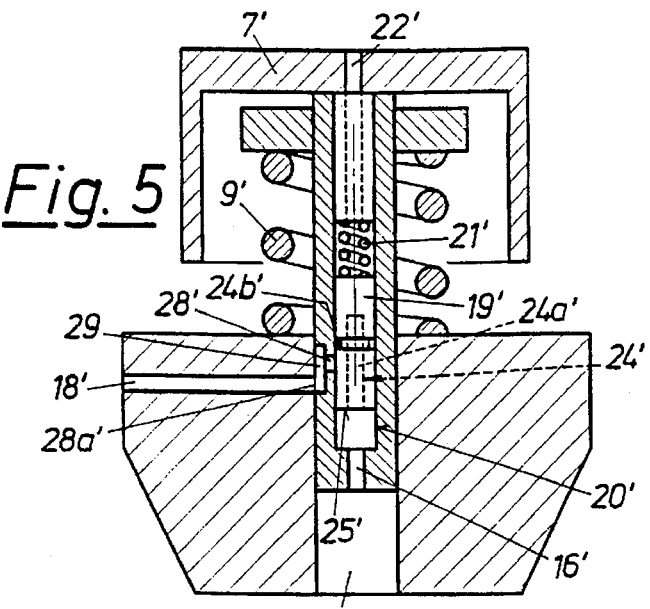
FIGS. 5 to 7 are enlarged views of the bypass valve of FIG. 4 in various positions.

FIG. 5 shows the bypass plunger 19' in its upper extreme position, in which it will stop the flow connection between the fuel bypass line 18' and the high-pressure space 10'.

Figure 6:
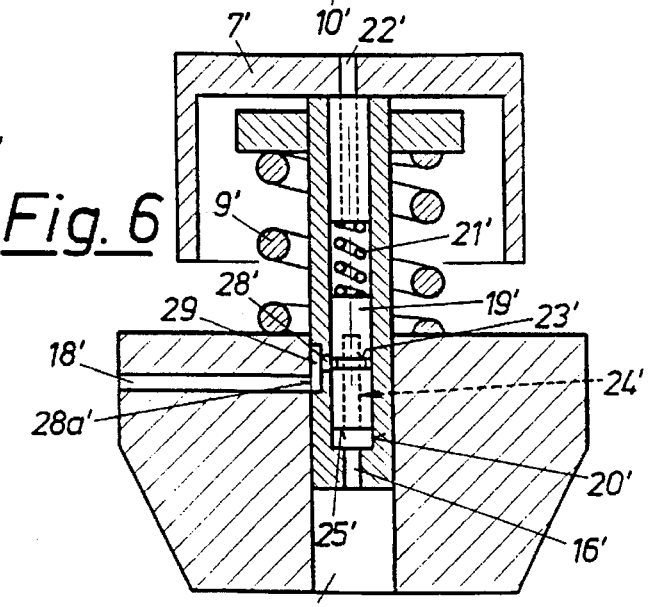

FIG. 6 shows an intermediate position of the bypass plunger 19', in which the flow connection between the high-pressure space 10' and the fuel bypass line 18' is established.

Figure 7:
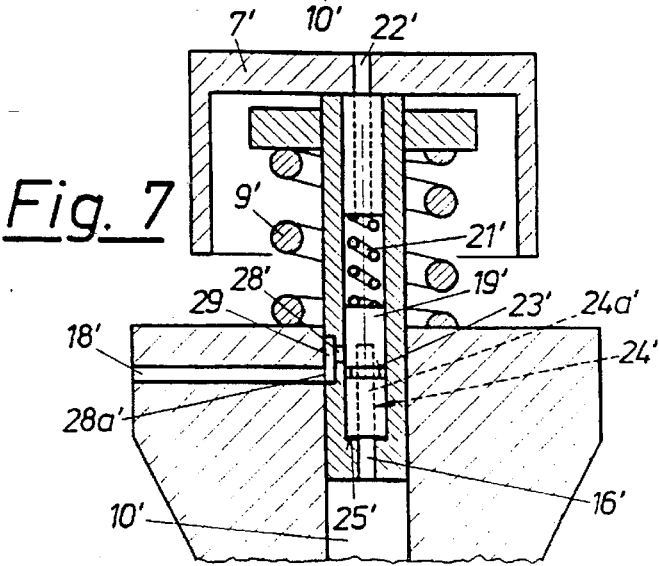
Figure 8A:
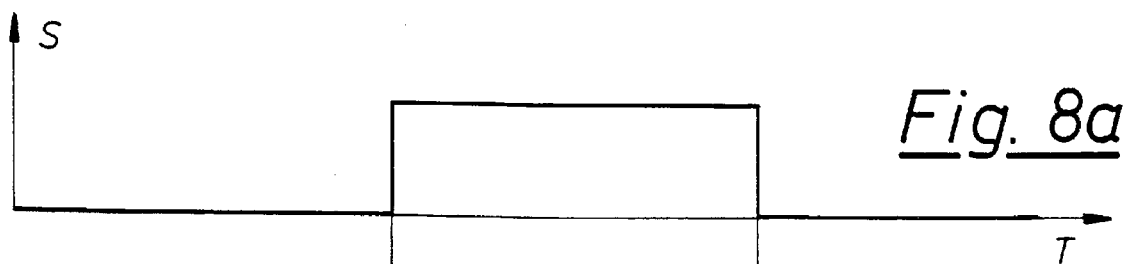
FIGS. 8a to 8e present various parameters of the injection nozzle during an injection process.
Figure 8B:
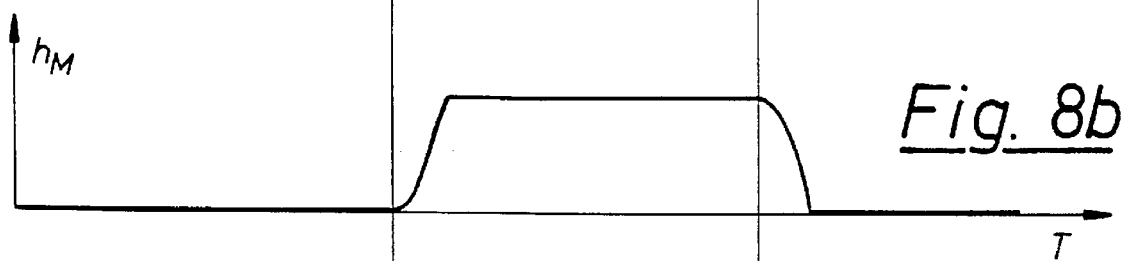
Figure 8C:
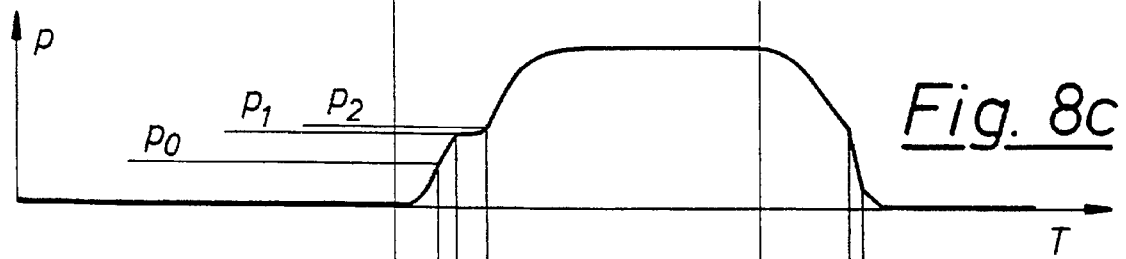
Figure 8D:
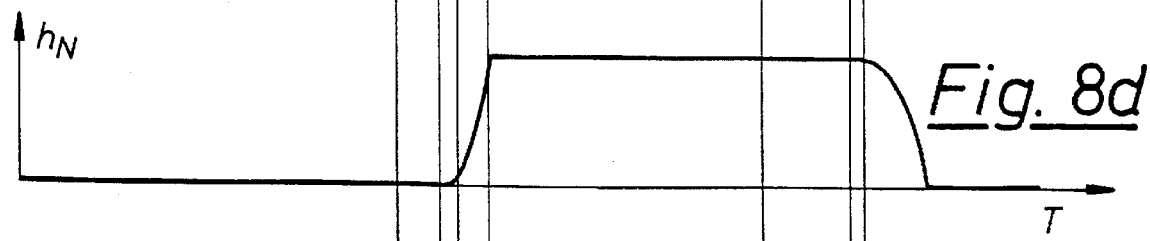
Figure 8E:
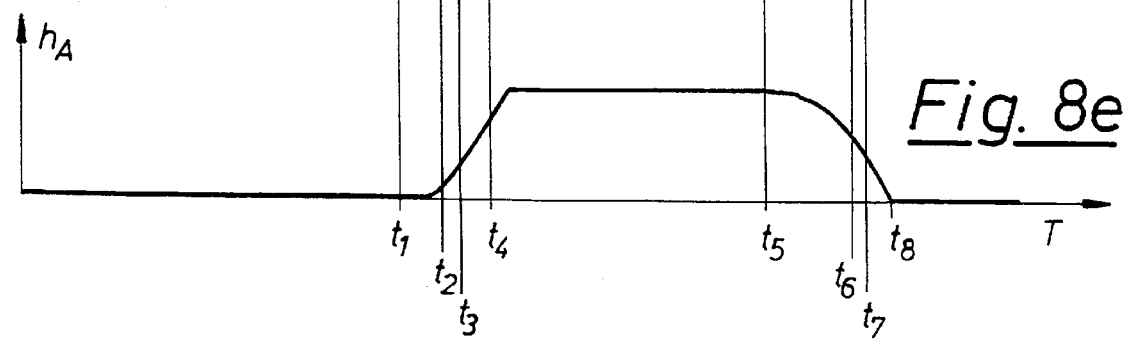

FIG. 7 shows the bypass plunger 19' in its initial position, in which the flow connection between the high-pressure space 10' and the fuel bypass line 18' is closed.

Diagrams (a) to (e) shown in FIG. 8 represent curves of various parameters during an injection stroke, each plotted over time T. FIG. 8a is the switching pulse S for the solenoid 2, FIG. 8b the lift $h_m$ of the control valve 3, 3', FIG. 8c the injection pressure p in the nozzle space 15, 15', FIG. 8d the lift $h_N$ of the fuel needle 14, and FIG. 8e the lift ha of the bypass plunger 19, 19'.

The solenoid 2, 2' is actuated by applying a switching pulse S at the time $t_1$. By moving the control valve 3 the medium-pressure space 5, 5' is connected to the high-pressure control line 4, 4' above the medium-pressure plunger 7, 7', and the hydraulic amplification plunger 6, 6' comprising the medium-pressure plunger 7, 7' and the high-pressure plunger 8, 8' is moved downwards. This movement will lead to a pressure rise in the high-pressure space 10, 10', the ratio of the pressures in the medium-pressure space 5, 5 and high-pressure space 10, 10' approximately corresponding to that of the cross-sectional of the medium-pressure plunger 7, 7' and the high-pressure plunger 8, 8'.

After reaching the opening pressure $p_0$ of the fuel needle 14, 14' at the time $t_2$, the fuel needle 14, 14' will open and the injection process is initiated. After the opening pressure $p_1$ of the bypass plunger 19, 19' has been reached at the time $t_3$, fuel is bypassed from the high-pressure space 10, 10' through the central bypass bore 24a, 24a' and the cross-bore 24b, 24b' inside the bypass plunger 19, 19', which will reduce the rate of the pressure rise.

At the time $t_4$ the closing pressure $p_2$ of the bypass plunger 19, 19' is reached. This will lead to a closing of the opening 28, 28', the pressure will rise more sharply again, and the injection process enters into its main phase.

At the time $t_5$ the final phase of the injection process initiated by activation of the solenoid 2.

In the final phase of injection the pressure drops below the level of $p_2$ once more, and the opening 28, 28' is uncovered by the bypass plunger 19, 19' for a short time. Due to the fuel escaping from the high-pressure space 10, 10' the decline in pressure is accelerated.

After the bypass plunger 19, 19' has closed the opening 28, 28' once more at the time $t_7$, the pressure decline will slow down slightly, until the closing pressure of the nozzle is reached and the injection process is completed at the time $t_8$.

I claim:

1. Fuel injection system for an internal combustion engine with direct fuel injection, with an electromagnetic control valve for pressurizing a medium-pressure space from an external medium-pressure reservoir, and a hydraulic amplification plunger comprising a medium-pressure plunger adjacent to the medium-pressure space and a high-pressure plunger adjacent to a high-pressure space, which high-pressure space is connected to a fuel delivery line on the one side and a nozzle space surrounding the fuel needle on the other side, where the high-pressure space can be connected to a fuel bypass line in at least one intermediate position of the high-pressure plunger, wherein a pressure-dependent bypass valve (17, 17') is provided in addition to the high-pressure plunger (8, 8') in the flow path between the high-pressure space (10, 10') and the fuel bypass line (18, 18'), which bypass valve (17, 17') will open the flow connection between high-pressure space (10, 10') and fuel bypass line (18, 18') for a narrow range of pressures in the high-pressure space (10, 10').

2. Fuel injection system according to claim 1, wherein the bypass valve (17, 17') comprises a bypass plunger (19, 19') moving in a bypass cylinder (20, 20'), one of the front faces (25, 25') of said bypass plunger (19, 19') being subjectable to high pressure via a connecting line (16, 16') leading to the high-pressure space (10, 10'), thus being movable against a restoring force acting on the bypass plunger (19, 19'), the bypass cylinder (20, 20') having an opening (28, 28') leading to the fuel bypass line (18, 18'), which is swept by the control edges (26, 27; 26',27') of a bypass space (31, 31') formed by the bypass plunger (19, 19') upon moving, the said bypass space (31, 31') being flow-connected with the high-pressure space (10, 10'), preferably via a bypass passage (24, 24') departing from the pressurized front face (25, 25') of the bypass plunger (19, 19').

3. Fuel injection system according to claim 2, wherein the bypass space (31, 31') is formed by a circumferential groove (23, 23') around the bypass plunger (19, 19').

4. Fuel injection system according to claim 1, wherein a spring (21, 21') is acting on the bypass plunger (19, 19'), which will provide the restoring force at least partially.

5. Fuel injection system according to claim 1, wherein the restoring force is provided at least partially by connecting the end of the bypass cylinder (20, 20') opposite of the opening of the connecting line (16, 16') with the medium-pressure space (5, 5') via a medium-pressure line (22, 22') preferably configured as a throttling bore.

6. Fuel injection system according to claim 1, wherein the bypass valve (17) is positioned in the high-pressure cylinder housing (11).

7. Fuel injection system with a fuel bypass passage opening into the high-pressure cylinder according to claim 1, wherein the bypass valve (17') is integrated in the high-pressure plunger (8').

8. Fuel injection system according to claim 7, wherein the high-pressure cylinder (8') has a longitudinal groove (29') next to the opening (28a') of the fuel bypass passage (18') into the high-pressure cylinder (11a'), which longitudinal groove (29') is connected to the opening (28') of the bypass cylinder (20'), its length preferably corresponding to the lift of the high-pressure plunger (8').

* * * * *